Figure 4:
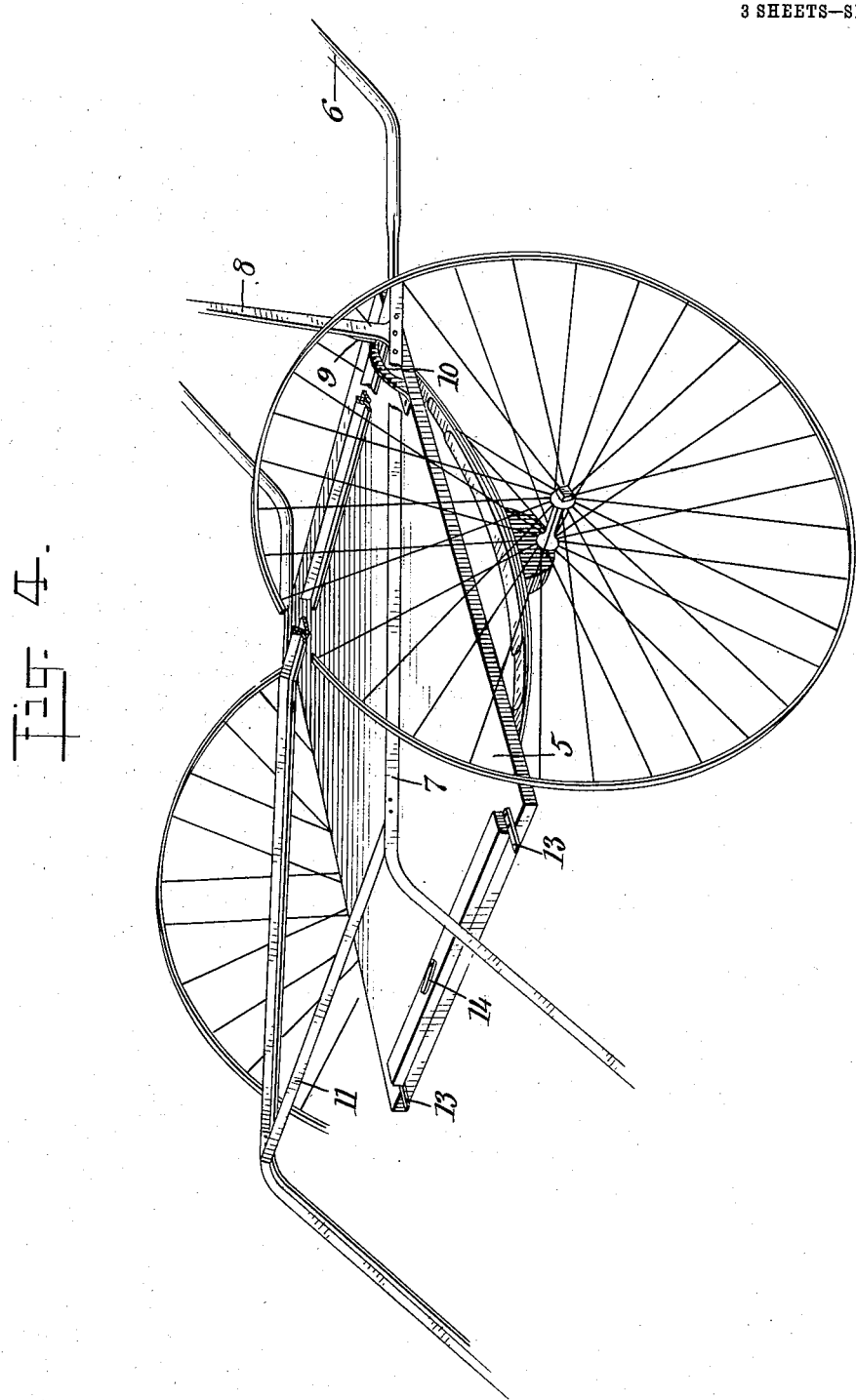

N. TRIPP.
CULTIVATOR.
APPLICATION FILED DEC. 2, 1908.
934,238.
Patented Sept. 14, 1909.
3 SHEETS—SHEET 1.
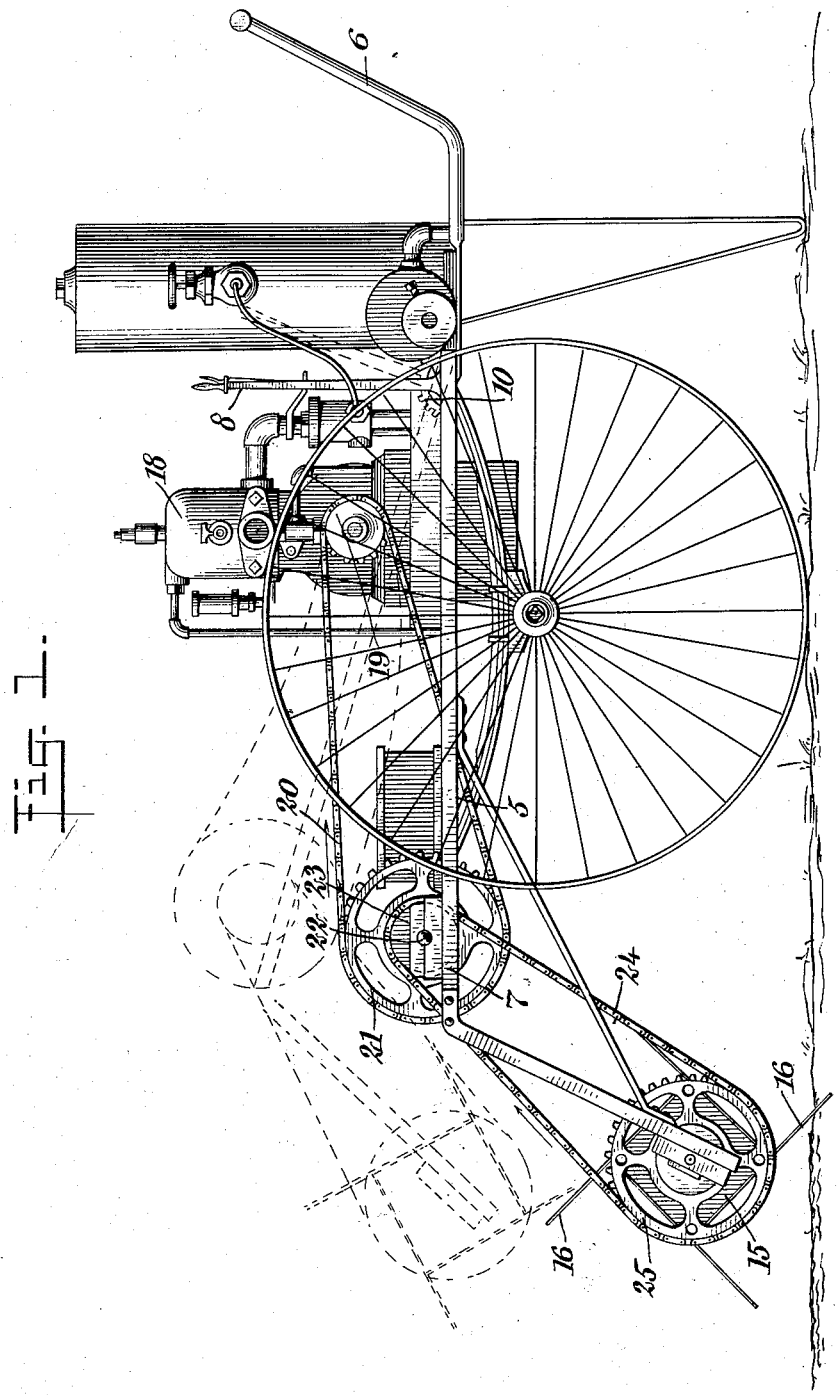
WITNESSES
INVENTOR
Nathan Tripp
BY
ATTORNEYS

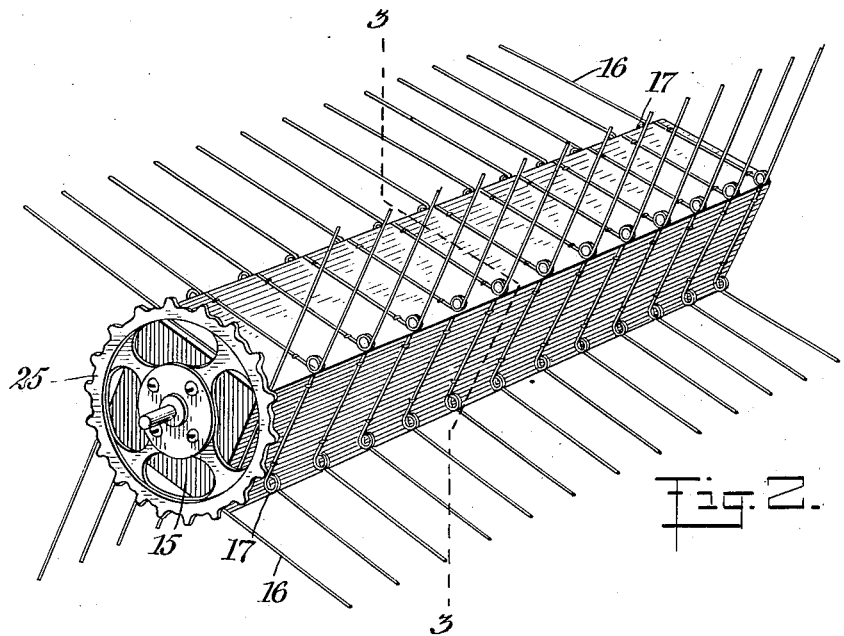
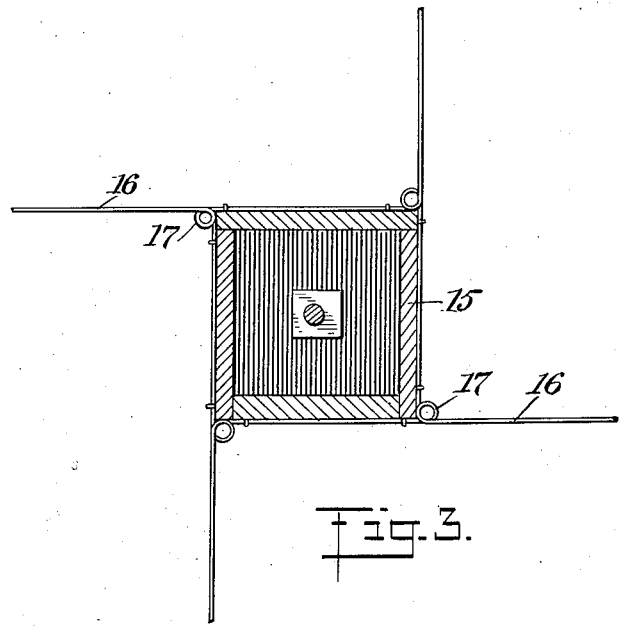

N. TRIPP.
CULTIVATOR.
APPLICATION FILED DEC. 2, 1908.

934,238.

Patented Sept. 14, 1909.
3 SHEETS—SHEET 3.

WITNESSES

INVENTOR
Nathan Tripp
BY
ATTORNEYS

UNITED STATES PATENT OFFICE.

NATHAN TRIPP, OF GRAND RAPIDS, MICHIGAN.

CULTIVATOR.

934,238.　　　　　Specification of Letters Patent.　　Patented Sept. 14, 1909.

Application filed December 2, 1908. Serial No. 465,698.

*To all whom it may concern:*

Be it known that I, NATHAN TRIPP, a citizen of the United States, and a resident of Grand Rapids, in the county of Kent and State of Michigan, have invented a new and Improved Cultivator, of which the following is a full, clear, and exact description.

The invention is an improved cultivator, which, in its preferred form, is motor-actuated, and is designed not only to pulverize the soil but also to effectively whip the dirt from the roots of weeds, etc. This is accomplished by providing the cultivating drum or cylinder with spring digging teeth which incline oppositely to the revolution of the drum, whereby they will be lifted rapidly from the ground on reaching a vertical position. The motor for driving the drum is carried on a wheel-supported bed, and the drum is journaled in a frame which is pivoted at its front to move vertically relatively to the bed when raising the cultivator above, and lowering it to, the ground.

Reference is to be had to the accompanying drawings forming a part of this specification, in which similar characters of reference indicate corresponding parts in all the views.

Figure 1 is a side elevation of a cultivator embodying my invention; Fig. 2 is a perspective view of the cultivating drum; Fig. 3 is a cross-section of the same substantially on the line 3—3 of Fig. 2; and Fig. 4 is a perspective view of the cultivator, with the motor and gearing removed and showing the frame raised at its rear end above the wheel-supported bed, as when the cultivator is elevated above the ground.

I have shown the carriage of my improved cultivator in the nature of a push-cart, the same comprising a wheel-supported bed 5 having a handle bar 6 which is rigidly attached to a marginal frame constructed of angle iron and pivoted or hinged at its front portion, as shown in Fig. 4. At the point of pivotal connection at one side of the frame a lever 8 is rigid therewith and has a spring-pressed latch 9 adapted to engage the teeth of an arc 10 and lock the frame in different positions relatively to the bed 5. The rear position of the frame is downwardly and rearwardly inclined and is provided with a cross-bar 11 at the top of the inclined position, which is adapted to seat on straps 13 carried by the bed 5, when the frame is dropped to operative position. With the frame in this position it is locked by a latch 14 which engages over the cross-bar 11 and affords a connection between the frame and bed in addition to that of the latch 9 and arc 10. Between the fork at the rear end of the frame is journaled a cultivating drum 15 which is provided with a number of digging teeth 16, these teeth being preferably of spring wire and have a coil 17 at the point of connection with the drum in order to augment the resiliency. When the teeth are constructed as shown, the drum is preferably made square in cross-section in order that the shank of each tooth which is at right-angles to the digging portion thereof may lie flat and be secured at suitable points of its length.

On the bed 5 is carried a motor 18, of the internal combustion type, and suitable accessories for its successful operation, such as a fuel tank etc., the motor being arranged slightly to the front of the axle in order to throw the major portion of the weight to this side. On the driving shaft of the motor is a sprocket wheel 21, the latter being carried on a countershaft 22 which is journaled in bearings adjacent to the cross bar 11. The countershaft 22 also carries a smaller sprocket wheel 23 which drives, by means of a chain 24, a larger sprocket wheel 25 in fixed relation to the cultivating drum 15, this manner of gearing the motor and cultivator together being employed to reduce the speed and augment the power.

In the use of the cultivator, the frame is raised to carry the cultivating drum above the ground, as when the machine is not in use, or when moving it to and from the field, or the elevation of the cultivator may be controlled to an extent by raising and lowering the handle bar. When the cultivator is to be placed in operation, the frame is lowered and locked to the bed and the motor started, which drives the cultivating drum in a direction to throw the dirt to the rear, pulverizing the soil and shaking the dirt well from the roots of weeds, grass etc. When the digging teeth strike an obstruction, they are enabled, by reason of their resiliency, to spring by it without injury. The tangential arrangement of the teeth is such as to incline them from the direction of revolution of the drum, whereby they will in effect be dragged through the ground and will rise quickly therefrom after passing to a vertical position.

Having thus described my invention, I claim as new and desire to secure by Letters Patent:

1. The combination of a wheel-supported bed, a marginal frame carried by said bed and hinged to the front thereof, means for locking the frame above the bed, a motor carried on the bed at its hinged end, a cultivator journaled in the rear portion of the frame, and means for driving the cultivator from the motor.

2. The combination of a wheel-supported bed, a marginal frame carried by the bed and hinged at the front thereof, with the rearward portion of said frame inclining downwardly and rearwardly, a cultivator journaled on the rearward end of the frame, a motor carried on the bed and operatively connected with the cultivator, a toothed arc fixed to the bed, and a lever rigid with the frame and having a latch for engaging the teeth of the arc and locking the frame relatively to the bed.

3. The combination of a wheel-supported bed, a frame hinged at the front of the bed and having a downwardly and forwardly inclined portion at the rear, a cultivator journaled on the inclined portion of the frame, a cross-bar forming a part of the frame at the top of said inclined portion and adapted to seat at the rear portion of the bed, means for locking the cross-bar to the bed, and a motor carried by the bed, operatively connected with the cultivator.

4. A cart having a marginal frame hinged at the front thereof, with the rear portion of said frame downwardly and rearwardly inclined; a cultivator journaled on the inclined portion of the frame, means for locking the frame above the bed of the cart, and a motor carried by the cart and operatively connected with the cultivator.

5. The combination of a cart having a handle-bar at the front, a frame pivoted to the front of the cart and rigid with the handle bar thereof, means for locking the frame to the bed of the cart, a cultivator journaled on the rear portion of the frame, and a motor carried by the cart, operatively connected with the cultivator.

In testimony whereof I have signed my name to this specification in the presence of two subscribing witnesses.

NATHAN TRIPP.

Witnesses:
HOWARD R. STURTEVANT,
CYRENUS VAIL.